US007517178B2

(12) United States Patent
Martin

(10) Patent No.: US 7,517,178 B2
(45) Date of Patent: Apr. 14, 2009

(54) ROTARY CUTTER HEAD

(75) Inventor: Russ L. Martin, Peshtigo, WI (US)

(73) Assignee: Great Lakes Custom Tool Mfg., Inc., Peshtigo, WI (US)

( * ) Notice: Subject to any disclaimer, the term of this patent is extended or adjusted under 35 U.S.C. 154(b) by 96 days.

(21) Appl. No.: 11/353,921

(22) Filed: Feb. 14, 2006

(65) Prior Publication Data

US 2006/0219320 A1 Oct. 5, 2006

Related U.S. Application Data

(60) Provisional application No. 60/667,810, filed on Apr. 1, 2005.

(51) Int. Cl.
*B23D 13/00* (2006.01)
*B23C 5/22* (2006.01)

(52) U.S. Cl. .............................. 407/33; 407/50; 407/91; 144/230

(58) Field of Classification Search ................... 407/33, 407/35, 50, 40–43, 91, 110, 49, 38, 47, 117; 144/230; *B23D 13/00; B23C 5/22*
See application file for complete search history.

(56) References Cited

U.S. PATENT DOCUMENTS 3,688,367 A * 9/1972 Bennett et al. ................ 407/43
4,557,305 A * 12/1985 Berger et al. ................ 144/230
4,997,018 A * 3/1991 Carpenter et al. ........... 144/241
5,022,795 A * 6/1991 Stampfli et al. ............... 407/47
5,059,068 A * 10/1991 Scott ............................. 407/9
5,076,334 A * 12/1991 Landtwing .................. 144/230
5,176,191 A * 1/1993 Owens ....................... 144/230
5,647,699 A 7/1997 Martin et al.
5,904,193 A * 5/1999 Kellner ....................... 144/230
6,071,045 A * 6/2000 Janness ....................... 407/42
6,092,573 A * 7/2000 Zaiser ........................ 144/230
6,131,627 A * 10/2000 Zaiser ..................... 144/114.1
6,279,444 B1 * 8/2001 Kellner et al. ............ 83/698.41
7,048,476 B2 * 5/2006 Misenheimer et al. ........ 407/67

* cited by examiner

*Primary Examiner*—Boyer D Ashley
*Assistant Examiner*—Sara Addisu
(74) *Attorney, Agent, or Firm*—Reinhart Boerner Van Deuren P.C.

(57) ABSTRACT

A rotary cutter head includes a rotary body, resilient clamping arm, and at least one cutting blade. The clamping arm clamps the cutting blade radially inwardly first rather than in a circumferential direction in order to positively lock the cutting blade radially, and thereby prevent the cutting blade from migrating out of position slightly during high speed rotation of the cutter head.

27 Claims, 4 Drawing Sheets

ROTARY CUTTER HEAD

CROSS REFERENCE TO RELATED APPLICATIONS

This patent application claims the benefit of U.S. Provisional Patent Application No. 60/667,810, filed Apr. 1, 2005.

FIELD OF THE INVENTION

This invention pertains to an improvement for a cutting tool for use in a rotary power tool. More particularly, the invention relates to rotary cutter heads and cutting blades for use therewith.

BACKGROUND OF THE INVENTION

A rotary cutter head for releasably holding cutting blades is formed with cutting edges which extend radially outwardly of and generally axially along the outer periphery of the cutter head. Cutter heads of this general type are typically used in power machines such as routers, moulders, shapers or tenoners and are typically used to chamfer, round, or otherwise shape an edge portion of a workpiece of either non-ferrous metals, plastics, woods, etc.

In general, a cutter head of this type is formed with at least one recess for receiving a cutting blade. The recess extends generally radially inwardly from the outer periphery of the cutter head and extends substantially axially in the cutter head. Frequently, the recess extends across the entire width of the cutter head.

Prior cutter heads of this general type utilize threaded fasteners and a so-called gib to releasably secure the blade in the recess. The gib is shaped to generally conform to the shape of the recess and is sized to allow the gib and the blade to be slidably received in the recess. When installing a blade into the cutter head, the gib and the blade are manually located in the recess. The threaded fasteners are then screwed into threaded openings formed in the cutter head to draw the gib toward one side of the recess so as to wedge or otherwise clamp the blade in the recess. The blade and the gib used in these cutter heads must be manually aligned relative to one another and relative to the recess when they are installed into the recess. Moreover, this alignment must then be maintained until the gib and the blade are secured in the recess.

In one prior cutter head, the fasteners extend through openings formed in the gib, and the heads of the fasteners engaging the gib to secure the gib and the blade in the recess. In this instance, each time that the blade is changed, the gib and the fasteners must be removed from and reinstalled into the recess.

In another prior cutter head, the fasteners draw pins through openings formed in the gib. The pins are formed with enlarged heads which engage the gib and which wedge the gib and the blade in the recess. In this case, the gib and the pins need not be removed from the recess to change the blade. However, the gib and the blade must still be manually aligned as the fasteners are tightened. Moreover, the pins and the gib used in this cutter head easily fall out of the recess when the fasteners are inadvertently loosened too far.

The gib used in some prior cutter heads is formed with a fixed locating pin for establishing relative alignment between the gib and the blade. In such a cutter head, the locating pin is received into an opening formed in the blade before the gib and the blade are placed into the recess. While the fixed locating pin aids in establishing and maintaining alignment between the gib and the blade, the gib and the fasteners must be removed and reinstalled each time the blade is changed. Moreover, the gib and the blade must still be aligned relative to the recess.

In addition to a gib and the associated fasteners and pins, prior cutter heads are typically equipped with a back-up fastener to prevent the blade from flying out of the cutter head in the event that the gib loosens while the cutter head is rotating or in the event that the fasteners which secure the gib are not tightened before the machine is turned on. The back-up fastener extends through an opening in the blade and must either be backed out or completely removed from the cutter head before the blade can be removed from the recess. The back-up fastener must then either be turned inwardly or reinstalled when a new blade is installed in the cutter head.

Another prior cutter head is shown in U.S. Pat. No. 5,647,699 to Martin, et. al. This cutter head includes an integral clamping arm on the cutter head clamps a cutting blade into a slot recess formed into the cutter head. The clamp is loosened or tightened by one or more screws. The '699 patent has resulted in a commercially successful product. However, it has been realized that high speed rotation of the cutter head can generate large centrifugal forces which can dislodged the cutter blade slightly. The present invention relates to improvements in the fixing the position of cutting blades in cutter heads.

BRIEF SUMMARY OF THE INVENTION

The general aim of the present invention is prevent the cutting blade from slipping out of position in a radial direction due to centrifugal forces generated from high speed rotation of the cutter head during operation.

In accordance with this aim, an aspect of the present invention is directed towards an improved rotary cutter head which includes a clamp that positively locks one or more cutting blades in a radial direction. This positive radial clamping prevents the cutting blade from slipping slightly in a radially outward direction in response to centrifugal force generated by high rotational speeds of the cutter head. According to this aspect, the rotary cutter head includes a rotary cutter head body, at least one clamp which is moveable relative to the body to open and close a clamping recess and one or more cutting blades. The cutting blade has a slot which receives a tab provided by the corresponding clamp. When the clamp member is clamped down, the tab on the clamp member engages the inner side wall of the cutting blade. This causes the base end of the cutting blade to engage the bottom of the recess formed in the rotary cutter head body to positively lock the cutting blade in the radial direction. This prevents the cutting blade from inadvertently slipping radially outwardly during subsequent high-speed rotation of the cutter head.

One aspect of the present invention is directed toward a cutting blade which is configured to prevent the blade from migrating slightly out of position in the radial direction due to centrifugal force. The cutting blade is intended for use with a rotary cutter head as described above. This cutter head includes a resilient clamping arm that is adapted to clamp the cutting blade in a recess defined in the rotary cutter head. To accomplish this aspect, the cutting blade includes a specially configured slot on the leading face of the cutting blade which is intended to mate with a corresponding tab formed in the clamping arm on the rotary cutter head. The location and size of the slot is such that it provides means for ensuring that the cutting blade clamps in a radially inward direction when installed on the cutter head body. Specifically, the cutting blade slot is sized and positioned to ensure that the base end of the cutter blade and the bottom of the cutter head recess are positively engaged against each other when the cutter blade is clamped into the cutter head. This prevents the cutting blade from wandering radially outward during high speed rotation.

These and other objects and advantages of the invention will become more apparent from the following detailed description when taken in conjunction with the accompanying drawings.

Figure 1:
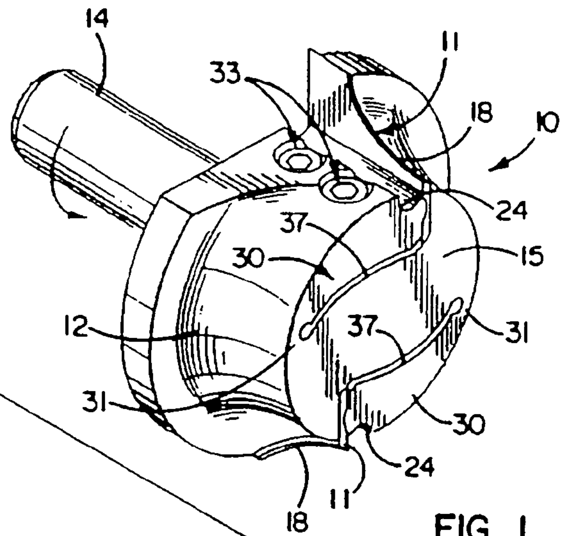
FIG. 1 is a perspective view of a new and improved rotary cutter head incorporating the unique features of the present invention and equipped with cutting blades.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in a cutter head 10 (FIG. 1) adapted to be installed in a rotary power tool such as a router (not shown) and adapted to releasably hold replaceable cutting blades 11 for shaping the edge portion of, for example, a wood or plastic workpiece (not shown).

Figure 3:
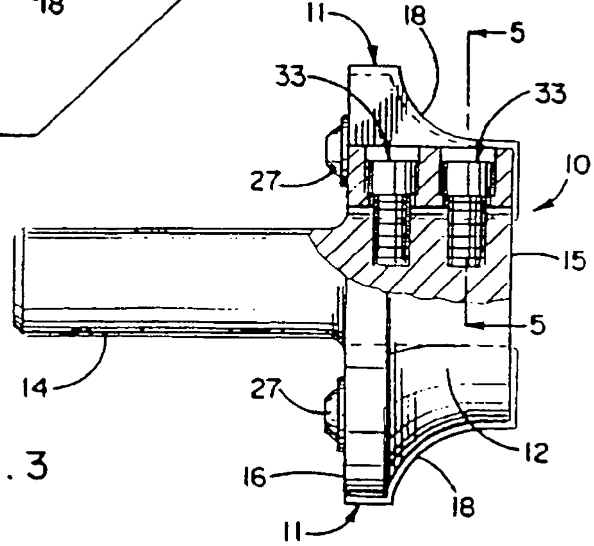
FIG. 3 is a side view with certain portions being broken away and shown in cross-section.
Figure 4:
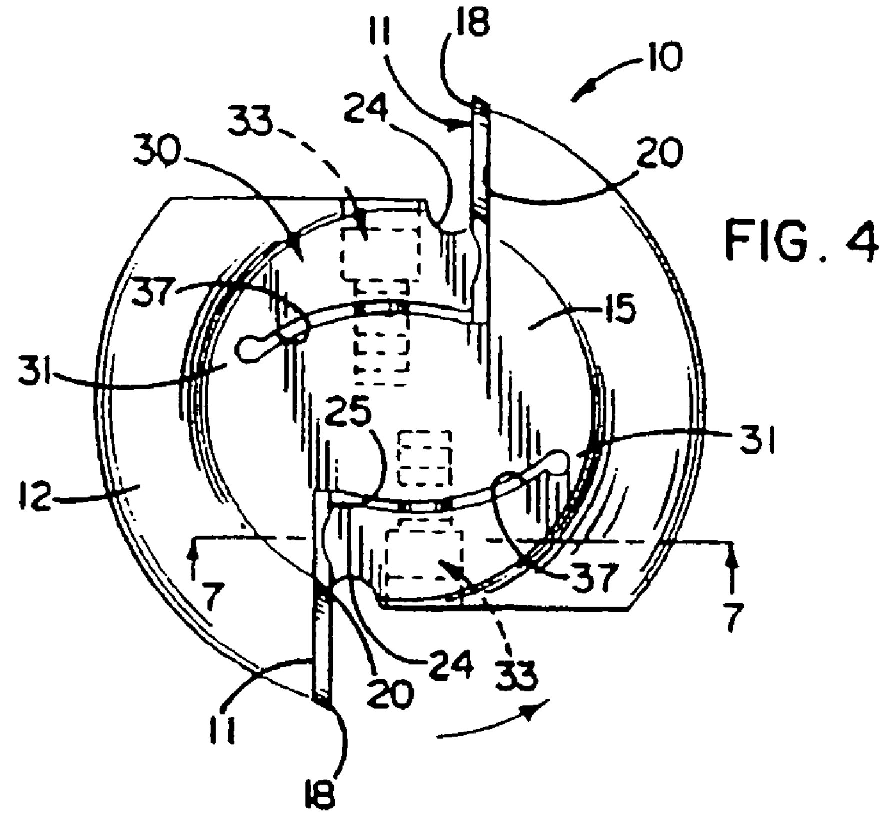
FIG. 4 is an end view of the cutter head.

The cutter head 10 includes a body 12 and a shank 14. The body is formed with front and back surfaces 15 and 16 (FIG. 3), respectively, and with a generally radially facing outer periphery which defines a substantially circular cross-section. The shank extends rearwardly from the center of the back surface and is sized to be received into a chuck or a collet of the rotary power tool such that the shank portion establishes the axis of rotation for the cutter head. Alternately, the body may be formed with a centrally located hole suitable for mounting to an arbor or a spindle of the power tool. The cutter head shown is adapted to be rotated in a counter-clockwise direction when viewed from the front of the cutter head (see FIG. 4).

The blades 11 are preferably formed from relatively thin (e.g., 0.079 inch), carbide and are ground with relatively sharp cutting edges 18 for engaging and cutting the edge portion of the workpiece. The distance between the base 19 of each blade and the cutting edge of that blade are precisely controlled during the manufacture of the blades to facilitate alignment of the cutting edges in the cutter head as discussed below. The blades may be formed with straight cutting edges or, as shown, they may be formed with profiled cutting edges for forming the edge portion of the workpiece to a predetermined shape.

Figure 2:
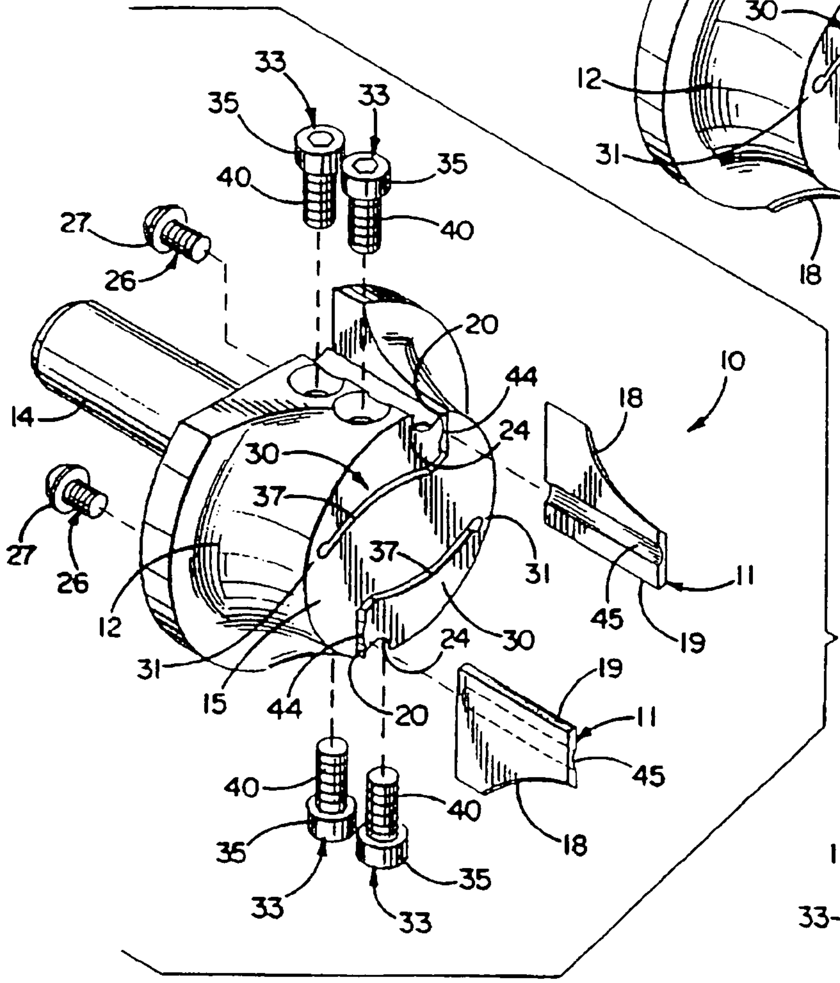
FIG. 2 is an exploded perspective view of the cutter head.

The blades 11 are secured into recesses 20 (FIG. 2) which extend generally radially inwardly from the outer periphery of the cutter head body 12 and which extend axially of the body. As a result, the recesses are defined, in part, by leading and trailing surfaces 21 and 22, respectively, (FIG. 6) which face generally circumferentially and generally toward one another. The blades are located in the recesses abutting the trailing surfaces of the recesses. The portions of the body defining the trailing surfaces are formed with a profile similar to the profile of the cutting edges 18 of the blades. In this way, the body provides relatively solid support for the blades as they engage the workpiece. In addition, gullets 24 are formed in the body adjacent to and on the leading sides of the recesses. The gullets provide clearance for the chips generated by the blades as the blades cut the edge portion of the workpiece.

The base of each recess 20 is formed with a generally radially outwardly facing surface or registry 25 which is precisely positioned relative to the center of the cutter head 10. The registry may be formed substantially perpendicular with respect to the trailing surface 22 of the recess, as shown, or it may be formed at an oblique angle relative to the trailing surface. When a blade 11 is installed into the recess, the base 19 of the blade rests on the registry so that the cutting edge 18 of the blade is precisely and repeatably positioned relative to the center of the cutter head.

Figure 5:
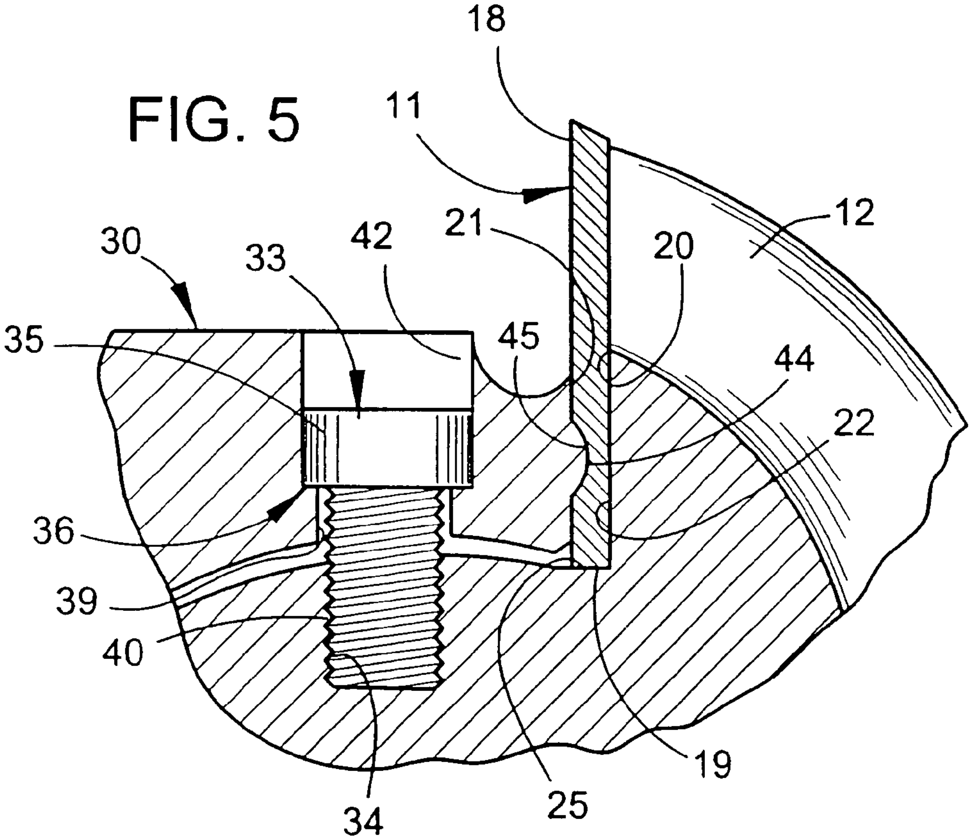
FIG. 5 is an enlarged fragmentary cross-sectional view taken substantially along the line 5-5 of FIG. 3.

In accordance with one aspect of the invention, the body 12 of the cutter head 10 is formed with integral clamping portions or arms 30 which are selectively movable between clamping positions (FIG. 5) and release positions (FIG. 6) relative to the blades 11 in the recesses 20. Each blade may be slideably inserted into or removed from the recess when the corresponding arm is in the release position. The blade is securely held in the recess when the corresponding arm is in the clamping position. The arm is resiliently biased to the release position but is selectively moved to the clamping position by simply turning screws 33 inwardly relative to the center of the cutter head. The arm resiliently returns to the release position when the screws are turned outwardly. As a result, the blades can be quickly installed into, secured in, and removed from the cutter head.

More specifically, each arm 30 is defined by an outer peripheral portion of the body 12. The arm is substantially separated from and is generally spaced radially outwardly from the center portion of the body but is formed with an end portion which is integrally connected to the center portion of the body by a relatively narrow, axially extending strip of material. This narrow strip of material defines an integral hinge 31 which is sized to elastically stretch so as to allow the arm to resiliently pivot radially inwardly and outwardly. The arm is further formed with a free end portion located opposite of the integral hinge. The free end portion defines a portion of one of the sides of the recess 20. The arm is preferably located on the leading side of the recess with the free end portion defining the entire portion of the leading surface 21 of the recess. With this arrangement, the leading surface of the recess approaches and recedes from the trailing surface as the arm pivots inwardly and outwardly, respectively.

The integral hinge 31 is adapted to bias the leading surface 21 of the recess 20 to a position relative to the trailing surface 22 such that the recess is sized to slideably receive the blade 11. As a result, the integral hinge biases the arm 30 radially outwardly to the release position. In addition, the screws 33 are threaded into threaded openings 34 in the center portion of the body. The heads 35 of the screws engage radially outwardly facing surfaces 36 formed on the arm between the free end portion and the integral hinge. As a result, the screws drive the arm radially inwardly from the release position and cause the leading surface of the recess to clamp the blade against the trailing surface 22 and the registry 25 as the screws are turned inwardly in the threaded openings. Accordingly, the screws are operable to selectively move the arm from the release position to the clamping position.

In carrying out the invention, the arm 30 is defined by forming an elongated slot 37 in the body 12 of the cutter head 10. The slot extends from the base of the recess 20 and in the same general direction as the direction of rotation of the cutter head. The slot is formed with a closed end which is radially inwardly of and adjacent to the outer periphery of the body. The integral hinge 31 is defined by the material which is located generally radially outwardly of the closed end of the slot. The closed end of the slot is preferably formed with a relatively large radius to define an enlarged, strain relief opening for reducing the stress concentration at the closed end of the slot due to the flexing of the integral hinge.

The shape of the slot 37 is not critical in carrying out the invention, but may be formed with any suitable curvature. For example, to aid in forming the registry 25, the slot shown extends from the base of the recess 20 having an initial angle which is equal to the angle of the registry relative to the trailing surface 22 of the recess. The slot then extends with a curvature which is greater than the general curvature of the outer periphery of the body 12. Alternately, the slot may be formed extending in a straight line from the recess.

Figure 6:
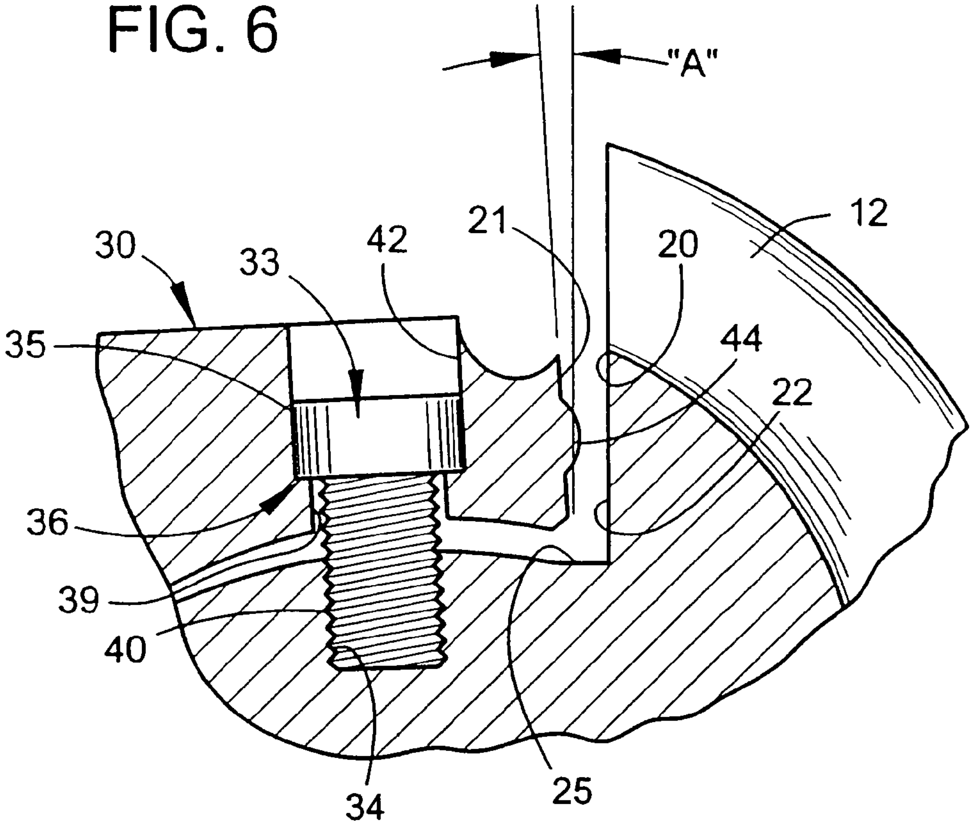
FIG. 6 is a view similar to FIG. 5 but shows a clamping portion in a release position and with the cutting blade removed.

The width of the recess 20, i.e., the distance between the leading surface 21 and the trailing surface 22, is precisely controlled within relatively tight tolerances. Specifically, the recess is sized to slideably but snugly receive the blade 11. The integral nature of the hinge 31 limits the movement of the arm 30. The relatively small clearance between the sides of the recess and the blade enables the hinge to stretch within the elastic limit of the hinge material as the arm moves from the release position to the clamping position. As shown in FIG. 6, the leading surface is inclined at a small angle as indicated by "A" relative to the trailing surface when the arm is in the release position. In this instance, the angle "A" reduces to zero and the leading surface is parallel with the trailing surface after the arm has been pivoted to the clamping position. Alternately, the leading surface of the recess initially may be substantially parallel to the trailing surface. Advantageously, the recess and the slot 37 may be formed in the same manufacturing operation if they are formed by electrical discharge machining.

In further carrying out the invention, each arm 30 is formed with holes 39 sized to slideably receive the threaded shank portions 40 of the screws 33. The holes 39 are located between the free end portion and the integral hinge 31 and extend generally radially through the arm. The threaded openings 34 in the center portion of the body are aligned with the holes 39 in the arm. To prevent the heads 35 of the screws from extending outwardly beyond the outer periphery of the body 12, the holes 39 are formed with counterbores 42 sized to receive the heads of the screws. The surfaces 36 are defined by the bottoms of the counterbores.

Figure 7:
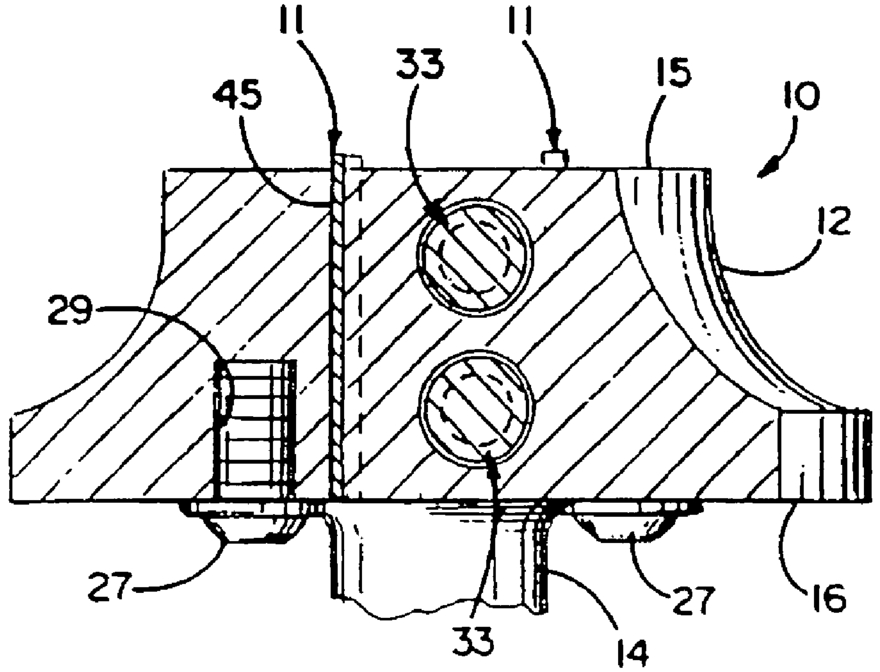
FIG. 7 is an enlarged cross-sectional view taken substantially along the line 7-7 of FIG. 4.

Advantageously, the cutter head 10 is equipped with screws 26 for establishing the location of the backside of the blades 11 relative to the back surface 16 of the body 12. More specifically, the screws 26 are screwed into threaded openings 29 (FIG. 7) extending forwardly and axially from the back surface of the body. The threaded openings are located adjacent the recesses 20 and are positioned such that the heads 27 of the screws 26 extend substantially across the recesses. When the back sides of the blades are aligned with the back surface of the body, the profiled cutting edges 18 of the blades are axially aligned relative to one another so as to evenly engage the edge portion of the workpiece.

With the foregoing arrangement, the cutter head 10 is especially adapted for ease of installation and removal of the blades 11. With the screws 33 sufficiently backed out of but remaining threaded into the threaded openings 34, the integral hinge 31 resiliently draws the leading surface 21 of the recess 20 away from the trailing surface 22 of the recess to provide clearance in the recess for receiving the blade. The blade is located and aligned in the recess by simply sliding the blade into the recess until the base 19 of the blade rests against the registry 25 and until the backside of the blade abuts the head 27 of the screw 26. When the screws 33 are turned inwardly, the heads 35 of the screws 33 engage the bottoms 36 of the counterbores 42 and cause the arm 30 to pivot inwardly about the integral hinge. As a result, the gap between the blade and the sides of the recess closes so that the leading surface clamps the blade against the trailing surface. Advantageously, if the leading surface is at a predetermined angle "A" when the arm is in the release position, the entire leading surface pivots into engagement with the blade when the screws 33 are turned inwardly. Applying a preload torque to the screws 33 firmly clamps the blade in the recess. To release the blade from the recess, the screws 33 are simply turned outwardly to allow the hinge portion to pull the leading surface away from the blade.

Further in accordance with the invention, the leading surface 21 is formed with an integral tab 44 and the blade 11 is formed with an axially extending slot 45 which is sized to slideably receive the tab. More specifically, the tab extends axially along the leading surface 21 of the recess and generally parallel to the registry 25. The tab projects into the recess toward the trailing surface 22 and locally restricts the width of the recess. The tab preferably extends along the entire leading surface to allow the recess, the slot 37, and the tab to be formed in the cutter head 10 during a single electrical discharge machining operation. With this arrangement, the blade is installed into the recess by aligning the slot 45 with the tab and sliding the blade axially into the recess until the blade engages the head 27 of the screw 26. As a result, the tab prevents the blade from flying out of the cutter head in the event the operator does not tighten the screws 33.

Figure 8:
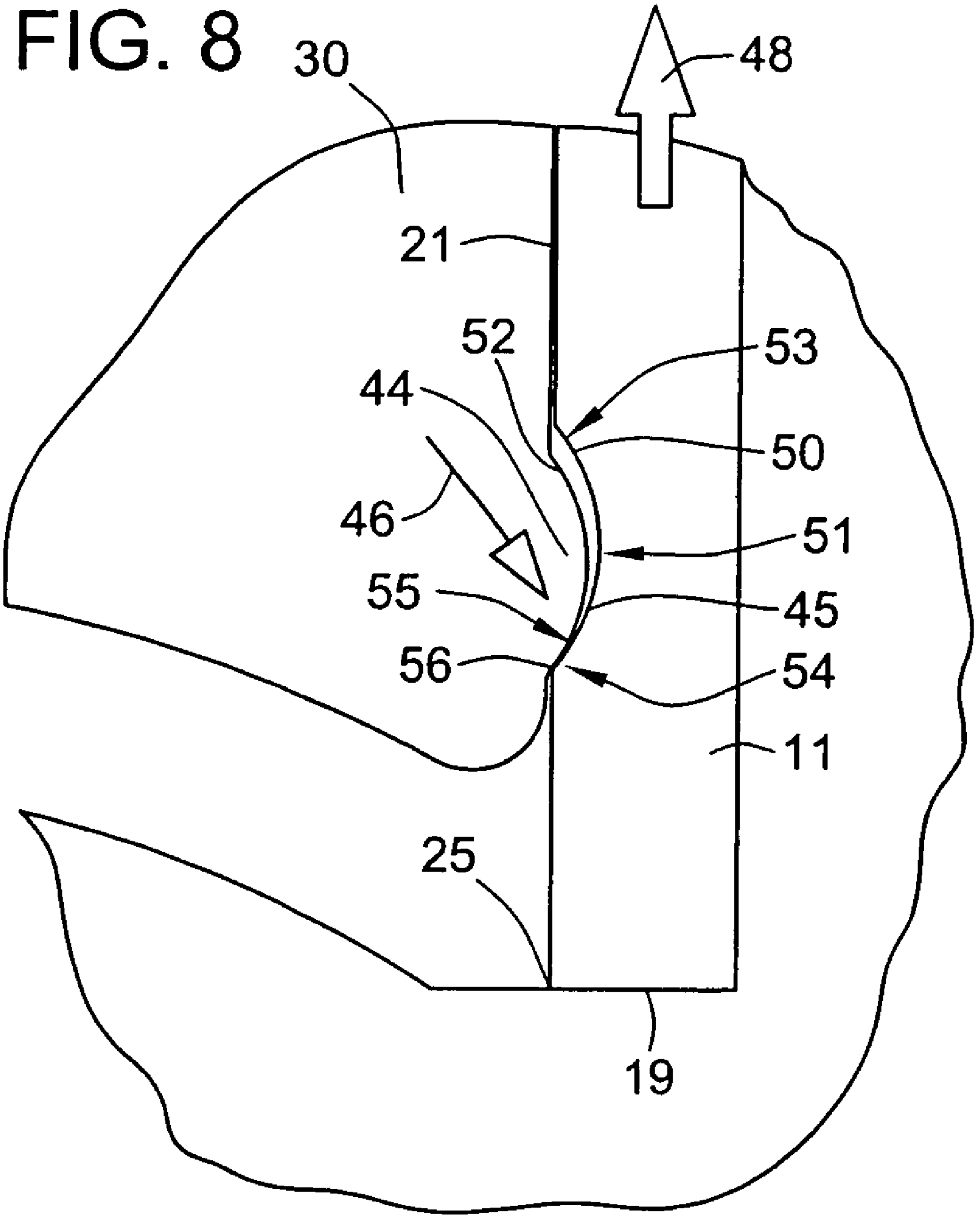
FIG. 8 is a further enlarged fragmentary cross-sectional view taken substantially along the line 5-5 of FIG. 3.

Because tab 44 is positioned on leading surface 21 of arm 30, the tab is generally radially inwardly biased, as indicated by bias arrow 46 (FIG. 8), when screw 33 is radially inwardly driven. The radial inward bias on tab 44 counteracts the centrifugal force, depicted by centrifugal force arrow 48 (FIG. 8), experienced by blade 11 when cutter head 10 is used. The radial inward bias on integral tab 44 further causes a tiny gap to be formed between the outer slot portion 50 of axially-extending slot 45 and outer tab portion 52 integral tab 44. Moreover, the radial inward bias ensures that when a blade 11 is installed into recess 20, the base 19 of the blade positively engages and is forcibly biased against the registry 25 so that the cutting edge 18 of the blade is precisely and repeatably positioned relative to the center of the cutter head.

The axially-extending slot 45 generally defines a slot bottom 51 interposed between an outer slot wall 53 and an inner slot wall 55. The inner slot wall 55 disposed further radially inwardly than the outer slot wall 53. In one embodiment, the slot 45 has greater dimensions (e.g., is larger and/or deeper) than the dimensions of integral tab 44. In other words, integral tab 44 is smaller is size than axially-extending slot 45. Having these parts so dimensioned ensures that integral tab 44 will provide a radially downward force upon axially-extending slot 45 of blade 11. In a further embodiment, there is a controlled distance between inward slot portion 54 of axially-extending slot 45 and base 19 of blade 11. As such, the distance between inward slot portion 54 of axially-extending slot 45 and registry 25 on cutter head 10 can be controlled, ensured and/or maintained while the cutter head is operated. In yet another embodiment, one or both of the inner slot portion 54 and inner tab portion 56 are rounded, as shown, or are oblique, angled, beveled, chamfered, or the like.

Within a structure of the cutting blade 11 there is provided means for controlling clamping of the cutting blade in a radially inward direction and for preventing radial sliding movement of the cutting blade when clamped in the recess 20, as is evidenced in the foregoing. More specifically, this means comprises two critical dimensions including the relative width of the cutting blade 11 between the leading and trailing faces of the cutting blade (dimension W), and the relative distance between the base end 19 of the cutting blade and inner wall of the slot (e.g., the portion of the slot wall closest to the base end). This distance has been indicated as dimension D in the drawings. In particular, if the cutting blade 11 is too thick, this will cause the clamping arm 30 to prematurely clamp the cutting blade with the leading and trailing faces 21, 22 rather than engage of the base end 19 with the registry 25. As shown, for example, in FIG. 8, the cutting blade 11 is sufficiently thin such that when the blade is clamped into position there is a virtually imperceptibly gap between the leading face of the cutter blade and the clamping arm 30. Additionally, the position of the inner wall is located relative to the base end 19 of the cutter blade 11 to ensure reliable contact and biasing engagement with the integral tab 44 of the clamping arm 30 as well as positive radially inward clamping of the blade. Thus, the size, configuration and relative location of the slot 45 in the present invention has been closely controlled and modified relative to the prior art to ensure proper positive radial inward clamping of the cutting blade 11. As such, radial sliding movement of the cutting blade 11 is prevented when the cutting blade is subjected to high rotational speeds during cutting operations. Given that the width W of the cutting blade 11 is ordinarily fixed or substantially fixed in a given application, it is therefore critical that the distance D be provided to ensure that when used in an application with a given rotary cutter head 10 that the blade will positively clamp radially inward rather than being clamped laterally between the leading and trailing faces 21, 22.

From the foregoing, it will be apparent that the present invention brings to the art a new and improved cutter head 10 in which the blades 11 are more easily installed into and releasably secured in recesses formed in the cutter head when compared to prior cutter heads of the same general type. The uniquely configured arms 30 which are connected to the body 12 by way of integrally formed resilient hinges 31 enable the blades to be clamped into and released from the recesses 20 by simply turning screws 33 inwardly and outwardly, respectively. By virtue of the relatively snug fit between the blades and the recesses, and by virtue of the heads 27 of the screws 26 located on the backside 16 of the cutter head, the blades are easily located in the recesses and repeatably aligned relative to one another. As a result, dull blades can be more quickly removed and replaced with sharp blades without the need to remove and reinstall the screws or other items from the cutter head. In addition, the uniquely configured tabs 44 restrict the radial movement of the blades when they are located in but not firmly clamped in the recesses without the need for separate back-up screws.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cutting blade adapted to prevent radially outward movement after installation in a recess of a rotary cutter head, the recess defining a recess bottom, the size of the recess being controlled by a clamp having a tab, the cutting blade comprising:

- a base end, an outer end, and a pair of opposed side ends extending transversely between the base end and the outer end;
- a leading face parallel to a trailing face, the leading and trailing faces extending transversely between opposed side ends and transversely between the base end and outer end, the leading face intersecting the outer end to form a cutting edge;
- a slot adapted to receive the tab, the slot extending laterally between opposed side ends, the slot including a slot bottom and inner and outer walls on opposed sides of the slot bottom;
- means between the inner wall of the slot and the base end for ensuring clamping of the cutting blade in a radially inward direction when in use with the clamp such that the base end and the recess bottom are engaged and radially outward movement of the cutting blade is prevented after the cutting blade has been installed within the recess of the rotary cutter head;

a relative dimensional relationship between the slot and the tab, wherein the slot has a greater dimension than the tab creating a gap between the slot and the tab when the cutting blade is clamped into the rotary cutter head, the greater dimension ensuing that a radially inward force is applied upon the cutting blade; and wherein the slot and the tab extend over an entire width of the cutting blade between opposed side ends when in use.

2. The cutting blade of claim 1, wherein the slot is formed into the leading face.

3. The cutting blade of claim 1, wherein the cutting blade is manufactured from carbide.

4. The cutting blade of claim 1, wherein the cutting blade adjacent the cutting edge tapers off from the leading face to the trailing face, as the cutting blade extends circumferentially.

5. The cutting blade of claim 1, wherein the slot of the cutting blade intersects the opposed side ends at an arch.

6. The cutting blade of claim 1, wherein when the cutting blade is installed a clamped position in the recess, the outer wall of the slot forms a gap with an outer tab portion of the tab on the clamp.

7. The cutting blade of claim 1, wherein the slot has constant depth over an entire extent between opposed side ends.

8. The cutting blade of claim 1, wherein the tab and the slot have a non-conical interface.

9. A cutting blade adapted to prevent radially outward movement when installed in a recess of a rotary cutter head, the recess defining a recess bottom and the rotary cutter head having a clamping member with an integral tab, the cutting blade comprising:

a base end, an outer end, and a pair of opposed sides extending transversely between the base end and the outer end;

a leading face substantially parallel to a trailing face, the leading and trailing faces extending transversely between opposed side ends and transversely between the base end and the outer end, the leading face intersecting the outer end to form a cutting edge; and a slot formed in the leading face and extending laterally between opposed side ends, the slot including a slot bottom and inner and outer walls on opposed sides of the slot bottom, the inner wall of the slot and the base end spaced apart a predetermined distance such that when the clamping member is driven radially inwardly the integral tab engages the inner wall of the slot and the base end positively biases the recess bottom thereby preventing radially outward movement of the cutting blade after being clamped in the recess of the rotary cutter head;

a relative dimensional relationship between the slot and the tab, wherein the slot has a greater dimension than the tab creating a gap between the slot and the tab when the cutting blade is clamped into the rotary cutter head, the greater dimension ensuing that a radially inward force is applied upon the cutting blade; and wherein the slot has constant depth over an entire extent between opposed side ends.

10. The cutting blade of claim 9, wherein the slot bottom the trailing edge are spaced apart a second predetermined distance that ensures that the cutting blade is clamped radially inward against the recess bottom first prior to clamping in a direction transverse thereto.

11. The cutting blade of claim 9, wherein the cutting blade is manufactured from carbide.

12. The cutting blade of claim 9, wherein the cutting blade adjacent the cutting edge tapers from the leading face to the trailing face, as the cutting blade extends circumferentially.

13. The cutting blade of claim 9, wherein the slot of the cutting blade intersects the opposed side ends at an arch.

14. The cutting blade of claim 9, wherein the outer wall of the slot is free from engagement with an outer tab portion of the tab on the clamp due to a gap formed between the outer wall and the outer tab portion when the base end is clamped against the recess bottom.

15. A rotary cutter head, comprising:

a cutter head body oriented for rotation about a rotational axis and having a recess, and a clamp for controlling the size of the recess with a tab provided on the clamp, the recess being defined by a leading face, a recess bottom and a trailing face; and a cutting blade having a base end positioned against the recess bottom and an axially-extending slot receiving the tab;

wherein the clamp has a tightened position in which the tab positively biases the cutting blade against the recess bottom and thereby prevents the cutting blade from slipping radially relative to the rotational axis during operation; and a relative dimensional relationship between the slot and the tab, wherein the slot has a greater dimension than the tab creating a gap between the slot and the tab when the cutting blade is clamped into the rotary cutter head, the greater dimension ensuing that a radially inward force is applied upon the cutting blade; and wherein the slot and the tab extend over an entire width of the cutting blade between opposed side ends.

16. The rotary cutter head of claim 15, wherein the clamp is arranged in front of the cutting blade and provides the leading face to the recess in the cutter head body.

17. The rotary cutter head of claim 16, wherein the axially extending slot is formed into a front face of the cutting blade.

18. The rotary cutter head of claim 15, wherein the clamp is a clamping arm integrally formed with the cutter head body and resiliently movable relative thereto, further including a threaded fastener tightening the clamp relative to the cutter head body.

19. The rotary cutter head of claim 15, wherein the slot comprises a radially inward wall, a radially outward wall and a slot bottom, and wherein the tab engages the radially inward wall to press the cutting blade against the recess bottom in the clamped position.

20. The rotary cutter head of claim 15, wherein the slot of the cutting blade intersects the opposed side ends at an arch.

21. The rotary cutter head of claim 15, wherein a gap is formed between an outer slot portion of the slot and an outer tab portion of the tab.

22. The rotary cutter head of claim 15, wherein the clamp in the tightened position does not positively clamp the cutting blade between the leading and trailing faces.

23. A rotary cutter head, comprising:

a cutter head body oriented for rotation about a rotational axis and having a recess, and a clamp for controlling the size of the recess, the recess being defined by a leading face, a recess bottom and a trailing face; and a cutting blade having a base end positioned against the recess bottom, an outer end, and a pair of opposed side ends extending transversely between the base end and the outer end, and a leading face parallel to a trailing face, the leading and trailing faces extending transversely between opposed side ends and transversely between the base end and outer end, the leading face intersecting the outer end to form a cutting edge;

a tab and a slot interface between the cutting blade and the clamp, wherein the clamp is arranged in front of the cutting blade and provides the leading face to the recess in the cutter head body, a relative dimensional relationship between the slot and the tab, wherein the slot has a greater dimension than the tab creating a gap between the slot and the tab when the cutting blade is clamped into the rotary cutter head, the greater dimension ensuing that a radially inward force is applied upon the cutting blade;

wherein the clamp has a tightened position in which the tab and the slot interface positively biases the cutting blade against the recess bottom and thereby prevents the cutting blade from slipping radially relative to the rotational axis during operation; wherein the slot and the tab extend over an entire width of the cutting blade between opposed side ends.

24. The rotary cutter head of claim 23, wherein the slot has a constant depth between opposed side ends.

25. The rotary cutter head of claim 24, wherein the clamp is a clamping arm integrally formed with the cutter head body and resiliently movable relative thereto, further including a threaded fastener tightening the clamp relative to the cutter head body.

26. The rotary cutter head of claim 25, further comprising a screw locating the cutting blade axially relative to the cutter head body, wherein axial location is functionally separated from the clamping of the cutting blade within the rotary cutter head.

27. The rotary cutter head of claim 26, wherein when the cutting blade is installed a clamped position in the recess, a gap exists between the leading faces of the clamp and the cutting blade.

* * * * *